July 30, 1929.  H. COOPER  1,722,625
ALIGNMENT COUPLING
Original Filed Oct. 2, 1923
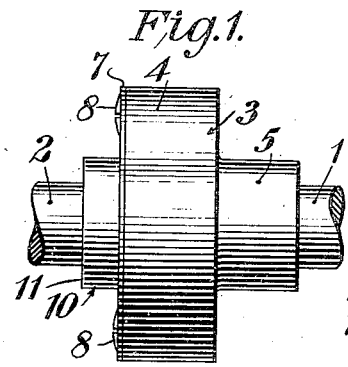
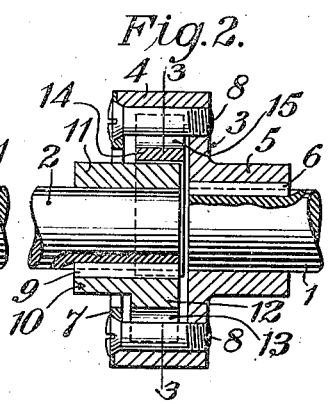
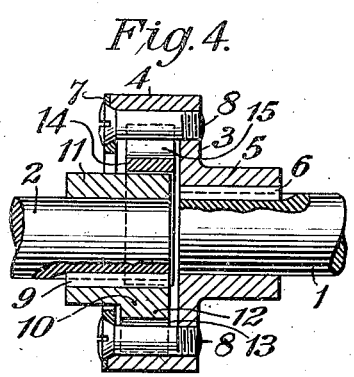
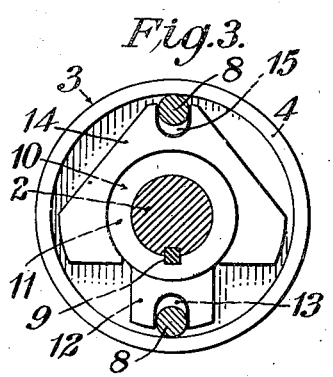
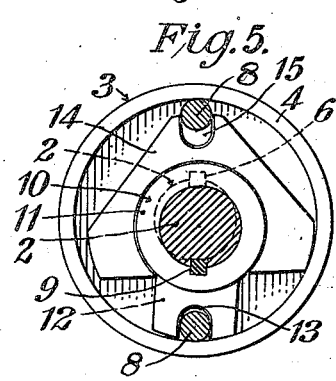
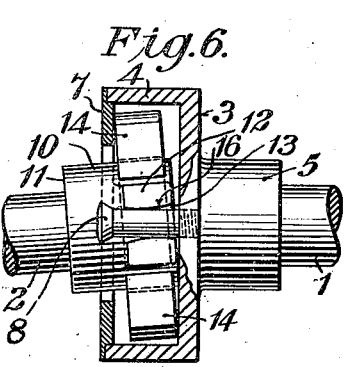
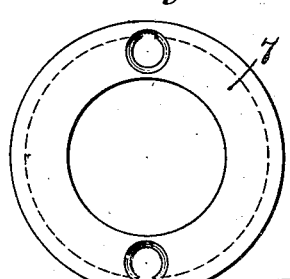
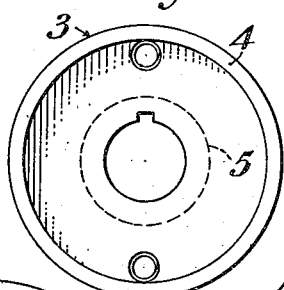
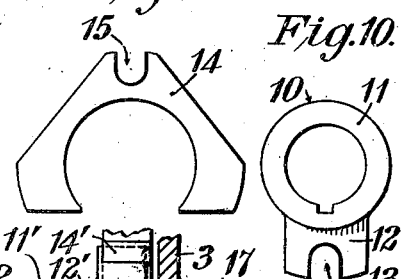
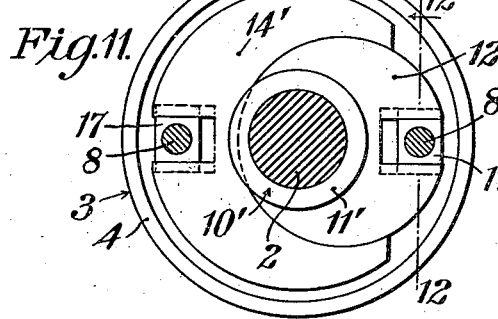
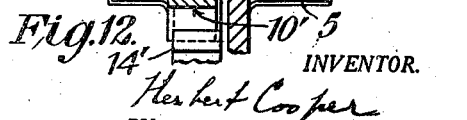
INVENTOR.
Herbert Cooper
BY Walter J. Gill,
ATTORNEY Patented July 30, 1929.

1,722,625

UNITED STATES PATENT OFFICE.

HERBERT COOPER, OF BROOKLYN, NEW YORK.

ALIGNMENT COUPLING.

Application filed October 2, 1923, Serial No. 666,078. Renewed December 12, 1928.

This invention relates to alignment couplings for connecting two shafts to permit them to run when they are out of line laterally or angularly. The lateral or angular displacement of the axis of one shaft with respect to that of the other may be permanent due to the mounting of the shafts or it may occur from time to time as a result of variations in the relative position of the shafts during the operation of the apparatus to which the shafts are connected.

Following the old and well known Oldham coupling many attempts have been made to produce couplings to take care of an out-of-alignment condition of two connected shafts. Many of the couplings which have been produced are complicated, impracticable and expensive. Other attempts have been made to produce couplings for this purpose by the use of flexible connections, such as units of thin metallic plates, or members formed of rubber, leather or the like. Couplings of this character are subject to the disadvantages due to deterioration of the materials which must be frequently renewed and at best they permit only a limited amount of lateral or angular displacement between the shafts.

The present invention has for its general object the production of an alignment coupling by which power may be transmitted from one shaft to another without depending upon flexible connections, but utilizing a few simple and easily constructed and assembled elements possessing maximum durability with minimum cost of manufacture.

This general object, as well as other specific objects which will hereinafter more clearly appear, is attained by providing an element, preferably in the form of a cup for the purpose of holding lubricant, adapted to be attached to one of the shafts which are to be coupled, and into which extends one end of the second shaft. The connection by which power may be transmitted between the shafts comprises a part permanently and immovably associated with the second shaft and movably engaging a member attached to the element and a part movably associated with this shaft but adapted to be held in driving relation thereto when the shafts are in rotation and likewise movably engaging a member attached to the element. It results from the construction that both parts of the connection are effective in transmitting power between the shafts, but are displaceable with respect to each other and the members attached to the element in accordance with changes in alignment of the shafts to permit one shaft to drive the other under these conditions.

To take care of an angular out-of-alignment condition of the shafts the parts of the driving connection between the shafts may be so related to the members attached to the element as to permit the parts to tilt with respect to the members in accordance with the angular displacement between the axes of the shafts. Slight clearances in the fit of the parts will be ordinarily sufficient for this purpose, but if provision should be made for greater angular displacement than can be obtained by permissible clearances the engaging surfaces of the parts and the members may be curved to permit greater tilting.

In the case of certain devices, such as electrical generators and motors, it is necessary to allow for lengthwise movements of the shafts relative to each other, or endwise floating of the shafts, as it is usually called. The coupling of the invention is therefore designed to permit longitudinal movement of one shaft with respect to the other by giving the elements of the coupling the required degree of freedom of movement with respect to each other in the direction of the length of the shafts.

The cup-shaped element of the coupling is preferably provided with a cover to form a more complete housing for the driving connection and to aid in retaining lubricant within the element. In order to simplify construction, the cover may be held in place by the members which are engaged by the parts of the driving connection and which will then be in the form of pins or screws to perform this double function.

To show even more clearly the nature of the invention two preferred embodiments thereof are shown in the accompanying drawing in which Fig. 1 is an external view of one form of coupling with the connected shafts in alignment, Fig. 2 is a vertical sectional view of the coupling of Fig. 1 with the shafts in the same condition, Fig. 3 is a transverse sectional view along the line 3—3 of Fig. 2, Fig. 4 is a view similar to Fig. 2 but with one of the shafts displaced laterally with respect to the other, Fig. 5 is a view similar to Fig. 3 but showing the elements in the positions they assume when the shafts have the relation shown in Fig. 4.

Fig. 6 is a sectional view in a plane at right angles to the section plane of Fig. 4 and showing the positions assumed by the elements of the coupling when the shafts are out of alignment angularly, Fig. 7 is a detail view of the cover element of the coupling, Fig. 8 is a similar view of the cup-shaped member viewed in the direction of the length of the shaft, Fig. 9 is a detail view of one of the driving elements, Fig. 10 is a similar view of the driving element adapted to be attached to the other shaft, Fig. 11 is a view partly in section of a modified form of coupling, and Fig. 12 is a view partly in section along the line 12—12 of Fig. 11.

In the embodiment of the invention shown in Figs. 1 to 10 inclusive, 1 designates one of the shafts and 2 the other shaft which are connected by the coupling. 3 is a cup-shaped element having a cylindrical wall 4 and an extension 5 adapted to be attached to the shaft 1 in any suitable manner, as by means of a key 6. 7 is a cover of annular form fastened to the open end of element 3 by screws 8 threaded into the element at diametrically opposite points. The shaft 2 extends into the cup portion of the element through the aperture in the cover and has attached to it, as by a key 9, a crank-like driving part 10 consisting of a hub portion 11 surrounding the shaft and an extension 12 provided with a slot 13 adapted to fit over one of the screws 8. 14 represents a co-acting driving part formed to partially surround the hub 11 and provided with a slot 15 adapted to fit over the other screw 8.

Assuming the shafts to be out of lateral alignment, as shown in Figs. 4 and 5 and that shaft 1 is the driving shaft, power will be transmitted from this shaft through element 3 and screws 8, 8 to the driving parts 10 and 14. The former will act as a crank fixedly connected to the driven shaft 2 in transmitting power to this shaft. The slot 13 of this part permits continuous rotation of the shafts even though they be out of alignment for when the direction of lateral displacement between the shafts lies in a plane passing through the screws there will be relative displacement between the slot 13 and the screw 8 lying within the slot, radially of the shafts. When the direction of lateral displacement between the shafts lies in a plane at right angles to the plane passing through the screws 8, 8 there is an angular displacement of the part 10 with respect to its screw. At other points in the rotation of the shafts the part 10 will assume positions relative to its screw 8 resulting from more or less of both of the displacements described above. At any instant, however, the slot of this part may be regarded as having a fixed relation to the screw since one or the other of its faces is held firmly in contact with the screw by the reaction of the driven shaft to the force being applied to it by the driving shaft.

In a similar manner there is a corresponding relative movement between the other screw 8 and the slot 15 of the other driving part 14 during rotation of the shafts, and likewise there is an instantaneous fixed relation between this screw and one of the faces of the slot 15 as power is being transmitted.

There being two points through which power is being transmitted at any instant and which may be regarded as fixed at that time and the two shafts being confined by their bearings the driving part 14 will be held in contact with the hub portion 11 of the other driving part 10 and be in effect locked to it as far as its function in transmitting power is concerned, but will be movable relatively thereto in accordance with changes in the position of the parts due to the out of alignment condition of the shafts.

The driving parts 10 and 14 and the screws 8, 8 may thus be regarded as constituting in effect a 3-point transmission between the driving shaft and the driven shaft, the screws 8, 8 representing two of the points through which power is transmitted and the hub 11 connecting the part 10 to the shaft and the portion of the part 14 which is held in driving engagement with the hub 11 representing together the third point. Power will thus be transmitted from the driving shaft through the screws 8, 8 to the driven shaft by a crank 12 which is directly connected to the shaft and through the region of contact between driving part 14 and the hub 11, which, since it lies to one side of the center-line of the driven shaft, will constitute a second crank arm through which the part 14 will be effective to turn this shaft.

The actions described above will take place during a complete rotation of the shafts, but in order not to complicate the drawing by additional illustrations of the various positions assumed by the elements during such rotation all of these positions have not been shown.

The permissible difference in alignment of the shafts is determined by the limits imposed by the inner face of wall 4 to the radial and angular displacements of the driving parts 10 and 14 which come in contact with the face at such limits. Such a condition of the parts has been shown in Figs. 4 and 5 which represent their greatest possible displacement since the outer end of the extension 12 of part 10 is in engagement with the inner face of wall 4 and one of the extended portions of part 14 is also in contact with this face. This, then, represents the maximum lateral out-of-alignment condition of the two shafts which will be permissible when the parts are proportioned as shown, and any lesser displacement of the two shafts will of course be taken care of.

While the action of the coupling has been described above in connection with a lateral out-of-alignment condition of the shafts, the action will be the same even when the shafts are in alignment for there will be the same tendency for the hub 11 to be held in engagement with one or the other of the faces of driving element 14. This action will take place even when the shafts are normally in alignment, so that under these conditions there will still be in effect a 3-point drive between the driving and driven shafts just as is the case when the shafts are out of alignment.

In order to permit shaft 2 to be driven by shaft 1 and the coupling when there is an angular displacement between them in faces of the slots 13 and 15 of the driving parts are given a slight curvature as shown most clearly at 16 in Fig. 6. This allows for angular displacement between the shafts when the displacement is in a plane at right angles to a plane passing through the screws 8, 8. To allow for the same displacement in a plane at right angles clearance may be provided between the driving parts 10 and 14 or reliance may be placed upon the tilting action permitted by the slotted connection of the driving parts to the screws 8, 8. It will be understood that in order to permit these tilting actions to occur the cover 7 must be spaced from the bottom of the cup-shaped portion of element 3 a distance greater than the thickness of driving part 14 and the extension 12 of driving part 10. This spacing of the cover also permits movement of the driving part 10 carried by shaft 2 with respect to the elements of the coupling connected to shaft 1, in the direction of the length of the shaft, thus allowing for endwise float of the shafts relatively to each other, to take care of such a condition if it occurs in practise.

In Figs. 11 and 12 there is shown an embodiment of the invention which is somewhat simpler to construct from the manufacturing point of view. In this embodiment the same kind of a cup-shaped element 3 is employed and screws 8, 8 transmit power between the element and the other parts of the coupling, which are modified as shown most clearly in Fig. 11. The driving part 10' which is attached to shaft 2 has a hub portion 11' surrounding the shaft, as in the first modification, but the extension 12' is of circular shape disposed eccentrically with respect to the hub with which however it is integral. The other driving part 14' has its outer periphery of circular form and its inner periphery is also of similar form and surrounds the correspondingly shaped portion 12' of the other driving part. By making these parts of circular form, as far as possible, the machining of them may be more easily and cheaply performed.

These figures also show a modified form of connection between the screws 8 and the driving parts, consisting of devices 17 slidably mounted on the screws and provided with curved surfaces adapted to fit within correspondingly curved straight slots in the driving elements. These connections permit the parts to move radially and angularly in the same manner as the simple slot connections of the modifications shown in Figs. 1 to 10, and also allow one of the shafts to be out of angular alignment since in one position the driving parts 12' and 14' may rock about the curved surfaces of the connecting devices 17, while in a position at right angles the devices will move along the screws 8 and this together with the clearances between the parts will permit angular displacement of the shafts. The operation of this form of the invention is the same as that described above, but the driving part 14' acts upon the driven shaft by a longer crank arm than does the part 14 which engages the hub of the part 10 in the first form.

In both forms of the invention the cup shaped portion of element 3 together with cover 7 form a housing to conceal and protect the driving parts of the coupling and also to form a receptacle to hold lubricant for these parts. If the shafts are vertically arranged, it will be understood that the shaft which carries the element will be placed below the other one in order to retain lubricant, as otherwise it would flow out of the coupling through the aperture of the cover, which must have sufficient clearance about the driving part to allow for the out-of-alignment condition of the shafts, which it is the object of the invention to provide for.

While certain preferred embodiments of the invention have been illustrated and described, it will be understood that it may be embodied in other forms and also that various changes may be made in the structures of all of the embodiments without departing from the principle of the invention as defined in the appended claims.

I claim:—

1. In an alignment coupling for a pair of shafts, a cup-shaped element adapted to be attached to one of the shafts, a cover for the element provided with an aperture through which the second shaft is adapted to extend, a pair of members connected to the element for holding the cover in place, a driving part adapted to be attached to the second shaft and operatively related to one only of the members and a second driving part movably connected to the first driving part and operatively related to the other member.

2. In an alignment coupling for a pair of shafts, an element adapted to be attached to one shaft, a pair of members connected to the element, a driving part having a cylindrical portion adapted to be attached to the second shaft and a radial extension displaceably associated with one of the members and a second driving part partly surrounding the cylindrical portion of the first part and displaceably associated with the other member.

3. In an alignment coupling for a pair of shafts, an element adapted to be attached to one shaft, a pair of members connected to the element, a driving part having a cylindrical portion adapted to be attached to the second shaft and a circular portion disposed eccentrically with respect to the cylindrical portion and displaceably associated with one of the members and a second driving part having an arcuate periphery and an arcuate opening partly surrounding the circular portion of the first part and displaceably associated with the other member.

In testimony whereof I affix my signature.

HERBERT COOPER.